United States Patent
Bergmann

(10) Patent No.: US 8,355,119 B2
(45) Date of Patent: Jan. 15, 2013

(54) METHOD FOR OPTICAL MEASUREMENT OF VELOCITIES ACCORDING TO THE SPATIAL FREQUENCY FILTERING METHOD AND SENSOR FOR OPTICAL MEASUREMENT OF VELOCITIES

(75) Inventor: Arno Bergmann, Gelsenkirchen (DE)

(73) Assignee: Fraba AG, Cologne (DE)

( * ) Notice: Subject to any disclaimer, the term of this patent is extended or adjusted under 35 U.S.C. 154(b) by 51 days.

(21) Appl. No.: 12/810,977

(22) PCT Filed: Dec. 12, 2008

(86) PCT No.: PCT/EP2008/067443
§ 371 (c)(1),
(2), (4) Date: Jan. 26, 2011

(87) PCT Pub. No.: WO2009/083425
PCT Pub. Date: Jul. 9, 2009

(65) Prior Publication Data
US 2011/0116073 A1 May 19, 2011

(30) Foreign Application Priority Data
Dec. 28, 2007 (DE) .......................... 10 2007 063 355

(51) Int. Cl.
*G01P 3/36* (2006.01)
(52) U.S. Cl. ......................................... 356/28; 356/28.5
(58) Field of Classification Search ........... 356/28–28.5, 356/3.01–3.15, 4.01–4.1, 5.01–5.15, 6–22
See application file for complete search history.

(56) References Cited

U.S. PATENT DOCUMENTS
3,856,401 A * 12/1974 Heitmann et al. ............... 356/28
4,040,741 A * 8/1977 Swift ............................... 356/28
(Continued)

FOREIGN PATENT DOCUMENTS
DE 42445211 A1 7/1994
(Continued)

OTHER PUBLICATIONS
Novotny, Josef Jr., Quality Control of the Sterotactic Radiosurgery Procedure with the Polymer-gel Dosimetry, Radiotherapy and Oncology, vol. 63, pp. 223-230, Elsevier, 2002.*

(Continued)

*Primary Examiner* — Luke Ratcliffe
(74) *Attorney, Agent, or Firm* — Porzio, Bromberg & Newman, P.C.

(57) ABSTRACT

The invention relates to a method for measuring a relative velocity between an object surface (O) and a sensor (1) having at least one light-sensitive element (2) according to the spatial frequency filtering method, wherein the light-sensitive element (2) is read out at time intervals, and wherein the spatial frequency filter is designed as at least one masking grating having a variable grating constant. The method according to the invention is characterized in that the relative velocity is firstly measured with a first grating constant $k_1$ having a large period length and/or over a short observation time period $t_1$ (rough measurement) and then the measurement of the relative velocity is repeated for an exact determination using a second grating constant $k_2$ having a small period length and/or over a long observation time period $t_2$ (fine measurement). The invention further relates to a sensor for velocity measurement.

20 Claims, 3 Drawing Sheets

U.S. PATENT DOCUMENTS

Figure 1:
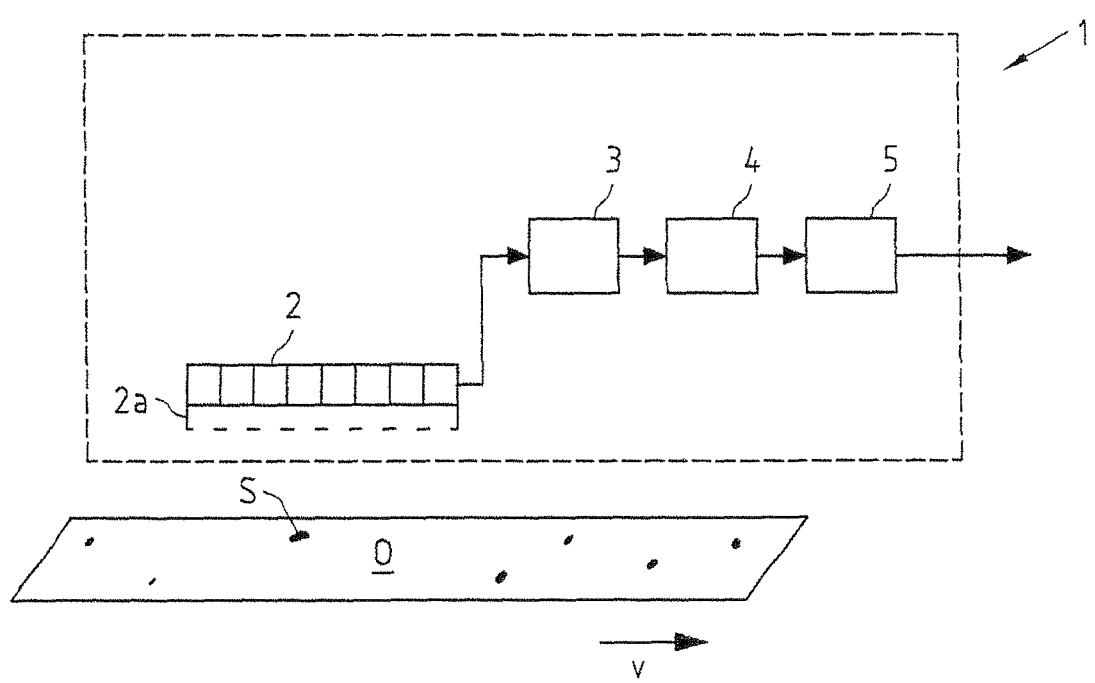

| | | | | |
|---|---|---|---|---|
| 5,076,687 | A | * | 12/1991 | Adelson ...................... 356/4.04 |
| 5,229,830 | A | * | 7/1993 | Ishida et al. ................. 356/28.5 |
| 5,272,922 | A | * | 12/1993 | Watson ...................... 73/504.16 |
| 5,586,063 | A | * | 12/1996 | Hardin et al. ................. 702/142 |
| 2003/0142288 | A1 | * | 7/2003 | Kinrot et al. .................... 356/28 |
| 2003/0218776 | A1 | * | 11/2003 | Morimoto et al. ............. 358/2.1 |

FOREIGN PATENT DOCUMENTS

| | | |
|---|---|---|
| DE | 4444223 A1 | 6/1996 |
| EP | 0762127 A1 | 3/1997 |
| WO | 2007006642 A1 | 1/2007 |

OTHER PUBLICATIONS

Aizu, Y., Princoples and Development of Spatial Filtering Velocimetry, Applied Physics B, vol. 43, pp. 209-224, Springer-Verlag, 1987.*

Nierobisch et al., Skalensuche zur materialunabhangigen hochprazisen Geschwindigkeitsmessung mit dem Ortsfrequenzfilterverfahren, Konferenzebeitrage/IFM 2007 Winterthur, 12-13, 182-201 (2007).

Aizu et al., "Principles and Development of Spatial Filtering Velocimetry", Applied Physics B, Photophysics and Laser Chemistry B43(4):209-224 (1987).

* cited by examiner

METHOD FOR OPTICAL MEASUREMENT OF VELOCITIES ACCORDING TO THE SPATIAL FREQUENCY FILTERING METHOD AND SENSOR FOR OPTICAL MEASUREMENT OF VELOCITIES

CROSS REFERENCE TO RELATED APPLICATION

This is a National Stage of International Application No. PCT/EP2008/067443, filed 12 Dec. 2008, which claims the benefit of Application No. 10 2007 063 355.8, filed in Germany on Dec. 28, 2007, the disclosures of which Applications are incorporated by reference herein.

The invention relates to a method for measuring a relative velocity between an object surface and a sensor having at least one light-sensitive element according to the spatial frequency filtering method, wherein the light-sensitive element is read out at time intervals and wherein the spatial frequency filter is designed as at least one masking grating having a variable grating constant. The invention further relates to a sensor for measuring a relative velocity between an object surface and the sensor in the spatial frequency filtering method.

Sensors which operate according to different methods are known for measuring relative velocities between an observer or sensor, respectively, and the surface of an object. In general when measuring the relative velocities between the sensor and a surface it is irrelevant whether the sensor is moved relative to the object or the object is moved relative to the sensor. Ultimately, the velocity measurement is fundamentally based on the determination of a length, for example, the distance covered by the object in the measurement range of the sensor within a certain time. The velocity can thus be determined from the measured displacement and the time required. By simply integrating over the measured time, the distance covered or the length of an object, respectively, can also be determined with a corresponding sensor. Sensors for non-contact measurement of a relative velocity are therefore also suitable for the length measurement.

A plurality of methods is known for the non-contact measurement of a relative velocity. One of these methods is the spatial frequency filtering method. In this method a moving object is observed through fixed, grating-like periodic structures for the velocity measurement. The time-dependent output signal (spatial frequency filter signal) of the photosensor arrangement used is periodic with a dominant frequency which is proportional to the velocity component of the object oriented perpendicular to the alignment of the grating. If the spatial frequency filter signal is, for example, further processed by fast Fourier transformation, a frequency of the maximum proportional to the velocity is present in the relevant frequency spectrum.

The grating can be produced in various ways. In the case of the widely used dual-beam laser Doppler anemometry, the spatial frequency filter is produced by two equal-intensity partial beams of a laser beam being made to intersect at an angle $\phi$, wherein interference fringes functioning as a masking grating are formed in the volume of intersection of the two beams, their spacing being dependent on the wavelength of the incident light and the angle of intersection $\phi$. The disadvantage of this method lies in the very complex structure of the measurement system, which imposes the highest demands on the precision of the optics.

In a further variant of the spatial frequency filtering method, incoherent light is used to illuminate the object and a grating scanning is carried out. Particularly suitable in this case is the use of an active masking grating as a spatial frequency filter, i.e. the masking grating is simulated by a one-dimensional photosensor array. In this case, the spatial grating periodicity can be produced by alternately weighting the output signals of the read-out circuits of the photosensors. The particular advantage of this type of implementation of the spatial frequency filtering method compared with laser Doppler anemometry consists in particular in that the method can be implemented with a comparatively low expenditure on apparatus and that the grating periodicity of the spatial frequency filter is adaptive, i.e. can be adapted to the observed object surface provided with structure features of different size.

By superposing the moving object with a grating structure, a periodic output signal is generated in the light-sensitive element or elements of the sensor which, as has already been mentioned, can be assigned a characteristic frequency, for example, by Fourier transformation which for its part is directly proportional to the velocity to be measured. In this case, the frequency evaluation can also be determined by counting techniques or using an autocorrelation technique; further methods are known in the literature. In the spatial frequency filtering method, the highest measurable velocity is dependent on the one hand on the scanning rate—this can comprise the frame rate of a CCD camera or the scanning rate of an A/D converter downstream of a photodiode—and on the period length of the masking grating which is determined by the grating constant k on the other hand. In this case, with due regard to the sampling theorem, it holds that: the higher the scanning frequency and the greater the grating constant k, the higher the maximum measurable velocity. At the same time, however it holds restrictively that as the grating constant of the masking grating increases, the frequency resolution of the measurement and therefore the accuracy of the velocity measurement decreases. It further holds that as the observation time t increases, i.e. therefore as the number of scanning values taken into account for an evaluation cycle increases, the frequency resolution certainly increases but the mappable dynamics of the object movement decreases in the same way since instantaneous changes in the object velocity can no longer be represented accurately.

Starting from this, it is the object of the invention to provide a method for measuring a relative velocity between an object surface and a sensor according to the spatial frequency filtering method which renders possible a finely resolved precise measurement of a velocity profile without significant delay over a large velocity range with low expenditure on apparatus.

The object is achieved by a method for measuring a relative velocity between an object surface and a sensor according to the preamble of patent claim 1 in that the relative velocity is firstly measured with a first grating constant $k_1$ having a large period length and/or over a short observation time period $t_1$ (rough measurement) and then the measurement of the relative velocity is repeated for an exact determination using a second grating constant $k_2$ having a small period length and/or over a long observation time period $t_2$ (fine measurement).

The invention is based on the finding that in a precise measurement of a velocity, both a length variation $\Delta x$ and the associated time variation $\Delta t$ can be described precisely since in practice, every velocity measurement can be represented as an evaluation of a difference quotient $\Delta x/\Delta t$. By means of a refinement of the spatial resolution of the measurement in the form of a masking grating having reduced period length, according to the teaching of the invention, on the one hand, the length variation can be observed more precisely in stages from the rough measurement to the fine measurement. In this context, in the two-stage method selected according to the invention, the rough measurement using a grating constant $k_1$ having a large period length allows observation over a broad velocity range since the comparatively low dominant frequency of the spatial frequency filter signal read out from the light-sensitive elements, which is associated with a correspondingly "roughly set" masking grating, in practice does not at any point violate the sampling theorem according to which the highest measurable frequency must lie below half the scanning frequency. After the rough measurement has been made, the measurement of the relative velocity is repeated through the masking grating with reduced grating constant $k_2$. As a result of a finer masking grating or spatial frequency filter, respectively, the path progress $\Delta x$ of the object and therefore the velocity of interest can then be determined more precisely.

In addition or alternatively to a variation of the grating constant, in the method according to the invention the observation time period can also be varied in the course of the transition from the rough measurement to the fine measurement. Thus, it is provided in accordance with the invention that in the rough measurement, the measurement is made over a short observation time period $t_1$ so that the dynamics of the object movement can be better represented and predictions can be made about the constancy or non-constancy of the velocity. In the course of the fine measurement, the observation time period is then lengthened so that the velocity as such can be determined more precisely since a larger number of reference points is available with a lengthened observation time period, which makes a higher frequency resolution possible.

By means of the method according to the invention, a constant relative velocity between an object surface and a sensor can therefore be determined with little expenditure on apparatus and very high precision, on the other hand, a large variation of the velocity can be tracked rapidly.

According to a first advantageous embodiment of the invention, it is provided that the rough measurement with the first grating constant $k_1$ having a large period length and a short observation time period $t_1$ is first carried out at least twice and that in the event that the at least two measurement results substantially agree, the fine measurement with the second grating constant $k_2$ having a small period length over the long observation time period $t_2$ is carried out. In this case, therefore, a rough measurement of the velocity is firstly made again wherein, as mentioned, as a result of the high mappable dynamics of the measured object velocity, a precise prediction can be made as to the existing or non-existing constancy of the velocity whereas the absolute actual value of the velocity can only be roughly determined. According to the teaching of the invention, this rough measurement with a first large grating constant $k_1$, which for its part allows measurements in a broad velocity range, over a short observation time period $t_1$ which in turn allows a precise mapping of the temporal dynamics of the object velocity, is carried out multiple times, at least twice. It is then observed whether the determined frequency signals which are proportional to the velocity to be determined, substantially agree, wherein for example a 5-10% deviation of the respective values from one another can be deemed to be satisfactory agreement. If such an agreement is determined, it can be assumed that a constant relative velocity exists between the object and the sensor so that the measurement can be refined in a subsequent step in order to determine the value of the relative velocity exactly. As stated above, this refined measurement is then made with a reduced grating constant $k_2$ compared with the grating constant $k_1$ and over a lengthened observation time $t_2$ which accordingly allows for an increased number of scanning values in the evaluation. As already mentioned, this larger number of scanning values taken into account in the frequency space allows a correspondingly higher number of supporting points and consequently a higher frequency resolution, so that the velocity value can finally be determined precisely.

The fact that the lengthened observation time $t_2$ can only incompletely map the temporal dynamics of the relative velocity does no longer carry weight in the method according to the invention since the constancy of the velocity was already verified within the framework of the rough measurement.

In the method according to the invention, it should be noted that in the course of the fine measurement of the relative velocity, the sampling theorem is violated in many cases since the frequency of the periodic signal read out from the light-sensitive element or elements approaches the Nyquist frequency $\frac{1}{2}f_{scan}$ as a result of the reduced grating constant $k_2$. This results in the known "aliasing". However, the resulting ambiguities in the frequency spectrum can be eliminated by the information from the rough measurement by singling out in the fine measurement that frequency value which substantially corresponds to the velocity value determined in the rough measurement.

The masking grating having a variable grating constant used as a spatial frequency filter can be configured as a plurality of optical gratings each having a different but in each case a fixed grating constant. According to a particularly advantageous embodiment of the method, it is provided that the sensor comprises a plurality of light-sensitive elements spaced apart from one another, wherein the masking grating or the spatial frequency filter, respectively, is produced by a periodic weighting of the output signals of the light-sensitive elements. By means of this measure, the masking grating, i.e. the spatial frequency filter can easily be varied in its grating constant $k$ so that by simply varying the weighting function, the respective requirements for the rough measurement or fine measurement can be achieved. The light-sensitive elements of the sensor preferably comprise CCD, CMOS components, arrays or lines, photodiodes or phototransistors. In the case of a CCD line scan camera having, for example, 1024 linearly successively arranged pixels, the masking grating can be achieved with a large grating constant $k_1$, for example, by alternate weighting of blocks each of 64 adjacent pixels. A fine grating having a small grating constant can be achieved, for example, by blocks of 8 adjacent pixels which are each alternately weighted.

According to a further advantageous embodiment of the method according to the invention, in the rough measurement the information content of the spatial frequency filter signal read out from the at least one light-sensitive element in the spatial frequency filtering method or of the power density spectrum with a frequency $f_1$ allocated to the spatial frequency filter signal is monitored. Preferably a quality feature of the signal around the frequency $f_1$ or of the spatial frequency filter signal for the frequency $f_1$ is used to monitor the information content of the spatial frequency filter signal read out from the at least one light-sensitive element or of the power density spectrum with the frequency $f_1$ allocated to the spatial frequency filter signal, in particular the half-width and/or the signal-to-noise ratio and/or the logarithmic ratio of signal power to noise power and/or the interference-free dynamic range. If the monitoring of the information content of the spatial frequency filter signal measured in the rough measurement for the frequency $f_1$ reveals that this is too low, the measurement can be rejected.

The too-low information content of the determined frequency signal can be attributed to the fact that the grating constant $k_1$ selected in the rough measurement is not adapted to the dimensions of the structure feature or features observed on the object surface. In order to therefore achieve valid results in the rough measurement, according to a further advantageous embodiment of the invention it is provided that in the rough measurement for a subsequent measurement the first grating constant $k_1$ is adapted to a structure feature on the object surface.

By analogy with that stated previously, during the fine measurement the information content of the spatial frequency filter signal read out from the sensor or of the power density spectrum with a frequency $f_2$ allocated to the spatial frequency filter signal is monitored wherein preferably a quality feature of the signal around the frequency $f_2$ or of the spatial frequency filter signal for the frequency $f_2$ is used, in particular the half-width and/or the signal-to-noise ratio and/or the logarithmic ratio of signal power to noise power and/or the interference-free dynamic range.

If it is determined in the course of monitoring the information content that the information content for a valid measurement is too low, the measurement can be rejected. In addition, it is possible that in the event that the spatial frequency filter signal or the determined frequency $f_2$ allocated to the spatial frequency filter signal in the power density spectrum has a too-low information content, the frequency $f_2$ is replaced by the last-determined valid frequency $f_2^*$, by an average of a plurality of last-determined valid frequencies, in particular their arithmetic mean or their median, or an extrapolation of the progress of the last-determined valid frequencies. If the information content of the frequency $f_2$ is too low, it is ultimately advantageous that for a subsequent measurement the second grating constant $k_2$ is adapted to one or more structure features on the object surface.

According to a further embodiment of the method in accordance with the invention, after a fine measurement has been made, a plausibility check is made between the frequency $f_1$ determined in the rough measurement and the frequency $f_2$ determined in the fine measurement. In a valid measurement, the result of the plausibility check must be that the frequency $f_2$ determined in the fine measurement substantially agrees with the frequencies $f_1$ determined in the rough measurement. If this is not the case, the measurement can be rejected because the measured values lack plausibility.

It is further the object of the invention to provide a sensor for measuring a relative velocity between an object surface and the sensor in the spatial frequency filtering method, which has a simple structure and allows a precise measurement both of constant and varying relative velocities in a large velocity range.

The object is achieved according to the invention with a sensor according to the preamble of patent claim 16, in that the triggering and evaluation means are designed in such a manner that the relative velocity is firstly measured with a first grating constant $k_1$ having a large period length and/or over a short observation time period $t_1$ and then the measurement of the relative velocity is repeated for an exact determination using a second grating constant $k_2$ and/or over a long observation time period $t_2$.

The sensor has a particularly simple structure since it consists of few components which are available commercially in many designs. In addition, that stated previously applies for the advantages of the sensor according to the invention.

The object specified initially is further achieved by
a storage medium which can be read by a data processing system, with a computer program stored thereon, wherein the computer program includes instructions which cause at least one processor to execute a method according to any one of claims 1 to 15.

Figure 2A:
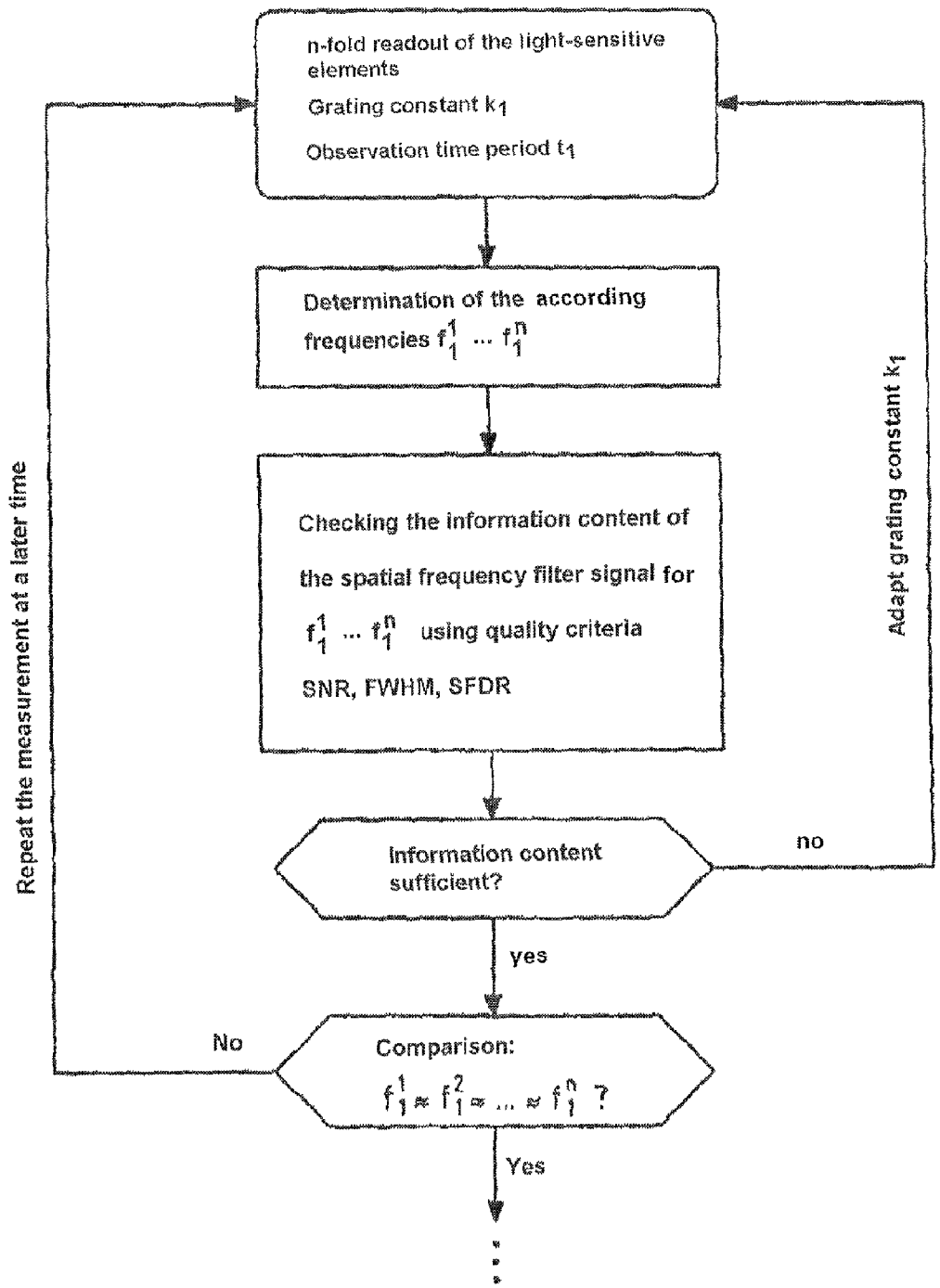
Figure 2B:
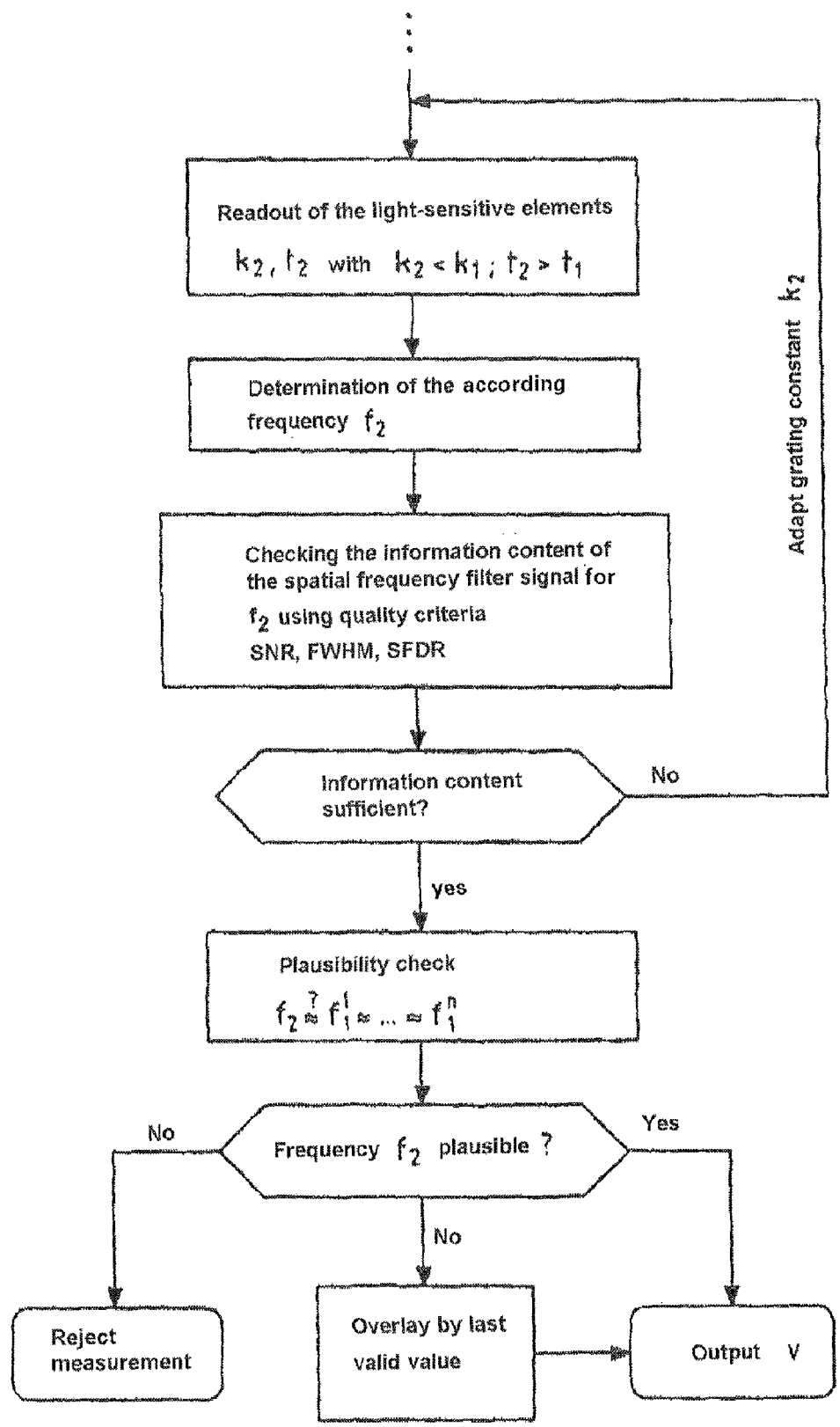

The invention is explained in detail hereinafter with reference to a drawing showing an exemplary embodiment. In the figures:

FIG. 1 shows a sensor according to the invention for the measurement of a relative velocity between an object surface and the sensor FIG. 2a shows a flow diagram to represent a process for measuring a relative velocity between an object surface and a sensor and FIG. 2b shows the continuation of the flow diagram from FIG. 2a.

FIG. 1 shows in highly schematic view a sensor 1 according to the invention for measuring a relative velocity in the spatial frequency filtering method between an object surface O and the sensor 1. The sensor 1 comprises a plurality of light-sensitive elements 2 arranged at a distance from one another, for example, in the form of a CCD camera line, an optics 2a which images the object surface O onto the light-sensitive elements 2 as well as triggering means 3 which read out the light-sensitive elements 2 of the sensor 1 with a scanning frequency $f_{scan}$. In order to produce a masking grating the output signals of the light-sensitive elements are alternately positively and negatively weighted, wherein when setting the grating constant k, the light-sensitive elements 2 can hereby be combined into blocks of variable length. The triggering means 3 relay the brightness values read out from the light-sensitive elements 2 to evaluation means 4 which for their part produce a signal proportional to the relative velocity to be measured. This is fed as a velocity value to an output unit 5, where it can then be output to the user.

In the triggering means 3 and evaluation means 4 the signals of the light-sensitive elements 2—for example, in a signal processor—are evaluated as follows:

FIGS. 2a and 2b show the method according to the invention for measuring a relative velocity between the object surface O and the sensor 1 according to the spatial frequency filtering method in the form of a flow diagram.

According to the invention, the measurement of the relative velocity is initially performed at least twice with a first large grating constant $k_1$ over a short observation time period $t_1$. This process designated as "rough measurement" is shown in FIG. 2a. It is further provided according to the invention that in the event that the at least two measurement results substantially agree, the measurement of the relative velocity is repeated for an exact determination with a second small grating constant $k_2$ over a long observation time period $t_2$. This is designated as "fine measurement" and is depicted in regard to its exact sequence in FIG. 2b.

The method according to the invention is now described in detail with reference to FIGS. 2a and 2b. An object having a surface O, for example, a material web, is moved at a velocity v under the sensor 1. In the rough measurement, the light-sensitive elements are now read out n times, wherein a large grating constant $k_1$ is set by the triggering means 3 by corresponding weighting of the output signals of the individual light-sensitive elements 2. If the light-sensitive elements for example are a CCD line-scan camera with 1024 pixels, the masking grating can be produced by combining in each case blocks of adjacently disposed pixels and alternately positively and negatively weighting. In the case of the rough grating constant $k_1$, the blocks comprise, for example, 64 adjacent pixels. In addition to the roughly selected grating constant $k_1$, each of the n-read-out processes takes place over a short observation time period $t_1$, for example, 1 millisecond. A short observation time period $t_1$ has the advantage that a precise mapping of the temporal dynamics of the object velocity is possible so that precise predictions can be made as to whether the object is moving at constant or non-constant velocity.

Due to the alternating, block-wise weighting of the pixel signals, a temporally periodic signal is produced n times in the triggering means 3, which is then relayed to the evaluation means 4. In this evaluation means the n time-dependent spatial frequency filter signals are assigned to their dominant n frequencies $f_1^1 - f_1^n$ by means of a fast Fourier transformation FFT or an alternative method, for example, an autocorrelation analysis. The information content of these frequency values $f_1^1 - f_1^n$ is now checked in the evaluation means using one, preferably a plurality of quality features of the individual spatial frequency filter signals for $f_1^1 - f_1^n$. Suitable as quality features for this purpose are the half-width $FWHM_1$ and/or the signal-to-noise ratio $SNR_1$ and/or the logarithmic ratio of signal power to noise power $SINAD_1$ and/or the interference-free dynamic range $SFDR_1$. If it is found using the aforesaid quality criteria that the information content of one or a plurality of spatial frequency filter signals for $f_1^1 - f_1^n$ is too low, the n-fold read-out of the light-sensitive elements is preferably repeated with a first grating constant $k_1$ better adapted to the structure features S present on the object surface O. If the structure features are, for example, so small that they cannot be resolved by the masking grating produced by means of the weighting function of the output signals of the light-sensitive elements 2, the grating constant $k_1$ must be made smaller. In this case, the observation time period $t_1$ on the other hand preferably remains unchanged.

If a renewed n-fold read-out of the light-sensitive elements 2 and the subsequent determination of the relevant dominant frequencies $f_1^1 - f_1^n$ of the spatial frequency filter signals reveals that the information content of the spatial frequency filter signals for $f_1^1 - f_1^n$ is sufficient, it is investigated in the following step whether the determined frequency signals or the velocity values strictly proportional thereto, respectively, substantially agree. A deviation of 5-10% can be assessed as sufficient agreement in this case. If such agreement does not exist, since the object is obviously not moving at constant velocity at the time of the measurement, the measurement must be repeated at a later time; the measurement which has been made must be rejected.

If sufficient agreement is established, the velocity measurement is subsequently refined as depicted in FIG. 2b.

The fine measurement is now performed with a smaller grating constant $k_2$ compared with the grating constant $k_1$ (e.g. blocks of 8 pixels each) and over a longer observation time period $t_2$ which accordingly allows for an increased number of scanning values in the evaluation. The lengthened observation time period is, for example, 4 milliseconds. This larger number of scanning values taken into account allows a correspondingly higher number of supporting points in the Fourier transformed signal and consequently a higher frequency resolution so that the frequency signal $f_2$ and therefore the velocity value to be determined can ultimately be determined precisely.

The information content of the spatial frequency filter signal determined in the fine measurement or the power density spectrum for $f_2$ produced by FFT is determined again preferably using quality criteria such as, for example, the half-width $FWHM_2$ and/or the signal-to-noise ratio $SNR_2$ and/or the logarithmic ratio of signal power to noise power $SINAD_2$ and/or the interference-free dynamic range $SFDR_2$ of the frequency signal $f_2$. If the information content of the spatial frequency filter signal for $f_2$ is not sufficient, a renewed read-out of the light-sensitive elements must again be performed whilst adapting the grating constant $k_2$ to the structure features S of the object O, wherein the grating constant $k_2$ should still be selected to be smaller than the grating constant $k_1$.

If the information content of the spatial frequency filter signal at $f_2$—possibly after repeated measurement—is sufficient, in the present case a plausibility check is made in which it is investigated whether the precisely determined frequency $f_2$ substantially agrees with the roughly determined frequencies $f_1^1 - f_1^n$. If this is the case, the frequency $f_2$ can be output as the velocity value proportional thereto to the output unit 5. If the frequency signal $f_2$ on the other hand is not plausible, it consequently does not agree with the previously roughly determined frequencies $f_1^1 - f_1^n$, either the measurement can be rejected or the frequency $f_2$ is overlaid by the last determined valid frequency $f_2^*$.

Alternatively, the average of several last determined valid frequencies, in particular the arithmetic mean or the median or an extrapolation of the progress of the last determined valid frequencies can be used. This value can then be output instead of the non-plausible frequency $f_2$ to the output unit 5.

What is claimed is:

1. A method for measuring a relative velocity between an object surface (O) and a sensor having at least one light-sensitive element according to the spatial frequency filtering method, wherein the light-sensitive element is read out at time intervals and wherein the spatial frequency filter is designed as at least one masking grating having a variable grating constant, comprising the steps of:
   firstly measuring the relative velocity with a rough measurement with a first grating constant $k_1$ having a large period length over a short observation time period $t_1$ and repeating the measurement of the relative velocity for an exact determination using a fine measurement of a second grating constant $k_2$ having a small period length over a long observation time period $t_2$ wherein the large period length is greater than the small period length and the short observation time period is smaller than the long observation time period.

2. The method according to claim 1, wherein the rough measurement with the first grating constant $k_1$ having a large period length over a short observation time period $t_1$ is first carried out at least twice and that in the event that the at least two measurement results substantially agree, the fine measurement with the second grating constant $k_2$ having a small period length over the long observation time period $t_2$ is carried out.

3. The method according to claim 1, wherein the sensor comprises a plurality of light-sensitive elements spaced apart from one another, wherein the masking grating is produced by a periodic weighting of the output signals of the light-sensitive elements.

4. The method according to claim 1, wherein during the rough measurement the information content of the spatial frequency filter signal read out from the at least one light-sensitive element or of the power density spectrum with a frequency $f_1$ allocated to the spatial frequency filter signal is monitored.

5. The method according to claim 4, wherein a quality feature of the signal around the frequency $f_1$ or of the spatial frequency filter signal for the frequency $f_1$ is used to monitor the information content of the spatial frequency filter signal read out from the at least one light-sensitive element or of the power density spectrum with the frequency $f_1$ allocated to the spatial frequency filter signal.

6. The method according to claim 5, wherein the quality feature is the half-width ($FWHM_1$) and/or the signal-to-noise ratio ($SNR_1$) and/or the logarithmic ratio of signal power to noise power ($SINAD_1$) and/or the interference-free dynamic range ($SFDR_1$).

7. The method according to claim 4, wherein if the information content of the spatial frequency filter signal for the frequency $f_1$ is too low, the measurement is rejected.

8. The method according to claim 4, wherein in the rough measurement for a subsequent measurement the first grating constant $k_1$ is adapted to at least one structure feature (S) on the object surface (O).

9. The method according to claim 1, wherein during the fine measurement the information content of the spatial frequency filter signal read out from the sensor or of the power density spectrum with a frequency $f_2$ allocated to the spatial frequency filter signal is monitored.

10. The method according to claim 9, wherein a quality feature of the signal around the frequency $f_2$ or of the spatial frequency filter signal for the frequency $f_2$ is used to monitor the information content.

11. The method according to claim 10, wherein the quality feature is the half-width ($FWHM_2$) and/or the signal-to-noise ratio ($SNR_2$) and/or the logarithmic ratio of signal power to noise power ($SINAD_2$) and/or the interference-free dynamic range ($SFDR_2$).

12. The method according to claim 9, wherein if the information content is too low, the measurement is rejected.

13. The method according to claim 9, wherein in the event that the spatial frequency filter signal or the frequency $f_2$ allocated to the spatial frequency filter signal in the power density spectrum has too-low information content, the frequency $f_2$ is replaced by the last valid frequency $f_2^*$, by an average of a plurality of last-determined valid frequencies, in particular their arithmetic mean or their median, or an extrapolation of the progress of the last-determined valid frequencies.

14. The method according to claim 9, wherein for a subsequent measurement of the fine measurement of the second grating constant $k_2$ is adapted to a structure feature (S) on the object surface (O).

15. The method according to claim 1, wherein after the fine measurement has been made, a plausibility check is made between the frequency $f_1$ determined in the rough measurement and the frequency $f_2$ determined in the fine measurement, wherein if the plausibility is lacking, the fine measurement is rejected.

16. A sensor for measuring a relative velocity between an object surface (O) and the sensor in the spatial frequency filtering method, wherein the sensor comprises at least one light-sensitive element and at least one masking grating having a variable grating constant as a spatial frequency filter, wherein the sensor further comprises triggering means and evaluation means, wherein the triggering means read out the at least one light-sensitive element of the sensor in time intervals and the evaluation means each produce a signal proportional to the velocity to be measured, wherein the triggering means and evaluation means are designed in such a manner that the relative velocity is firstly roughly measured with a first grating constant $k_1$ having a large period length over a short observation time period $t_1$ and then the measurement of the relative velocity is repeated for an exact determination using a second grating constant $k_2$ having a small period length over a long observation time period $t_2$ wherein the large period length is greater than the small period length and the short observation time period is smaller than the long observation time period.

17. The sensor according to claim 16, wherein the sensor comprises a plurality of light-sensitive elements spaced apart from one another, wherein the masking grating can be produced by a periodic weighting of the light-sensitive elements or by at least one fixed masking grating.

18. The sensor according to claim 17, wherein the light-sensitive elements of the sensor are CCD, CMOS components, arrays or lines, photodiodes or phototransistors.

19. A sensor for measuring a relative velocity between an object surface (O) and the sensor, wherein a plurality of sensors according to claim 16 are integrated in the sensor.

20. A storage medium which can be read by a data processing system, with a computer program stored thereon, wherein the computer program includes instructions which cause at least one processor to execute the method according to claim 1.

* * * * *